(12) United States Patent
Tamai et al.

(10) Patent No.: US 8,702,544 B2
(45) Date of Patent: Apr. 22, 2014

(54) WIDE-NODE DRIVE SYSTEM

(75) Inventors: Goro Tamai, West Bloomfield, MI (US); Anthony J. Corsetti, Rochester Hills, MI (US); Alan G. Holmes, Clarkston, MI (US); Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/534,483

(22) Filed: Jun. 27, 2012

(65) Prior Publication Data

US 2013/0116077 A1    May 9, 2013

Related U.S. Application Data

(60) Provisional application No. 61/555,788, filed on Nov. 4, 2011.

(51) Int. Cl.
*F16H 3/72* (2006.01)
*B60K 6/445* (2007.10)
*B60K 6/50* (2007.10)

(52) U.S. Cl.
USPC ............................................. 475/5; 475/150

(58) Field of Classification Search
USPC .............. 475/5, 149, 150, 207, 284, 302, 311
See application file for complete search history.

(56) References Cited

U.S. PATENT DOCUMENTS

| | | | |
|---|---|---|---|
| 6,491,599 B1 | 12/2002 | Schmidt | |
| 7,241,242 B2 | 7/2007 | Schmidt | |
| 8,162,084 B2 * | 4/2012 | Iwanaka et al. | 475/5 |
| 8,167,754 B2 * | 5/2012 | Phillips | 475/5 |
| 2007/0021258 A1 * | 1/2007 | Conlon | 475/5 |
| 2009/0098969 A1 * | 4/2009 | Tabata et al. | 475/5 |
| 2011/0172046 A1 * | 7/2011 | Conlon | 475/149 |

* cited by examiner

*Primary Examiner* — Justin Holmes
*Assistant Examiner* — Jacob S Scott
(74) *Attorney, Agent, or Firm* — Quinn Law Group, PLLC

(57) ABSTRACT

An electro-mechanical drive unit connectable with multiple power sources for launching and propelling a vehicle includes an output member, a stationary member, and a torque-transmitting device. The drive unit also includes a compound planetary gear arrangement having a first, second, third, and fourth junction point. The power sources include a first motor/generator and a second motor/generator. The first motor/generator and the second motor/generator are disposed on a common rotating axis. The second motor/generator is operatively connected to the compound planetary gear arrangement at the first junction point and the output member is operatively connected to the compound planetary gear arrangement at the second junction point. Additionally, the first motor/generator is operatively connected to the compound planetary gear arrangement at the fourth junction point. Furthermore, the torque-transmitting device is engageable to ground the third junction point to the stationary member.

20 Claims, 5 Drawing Sheets

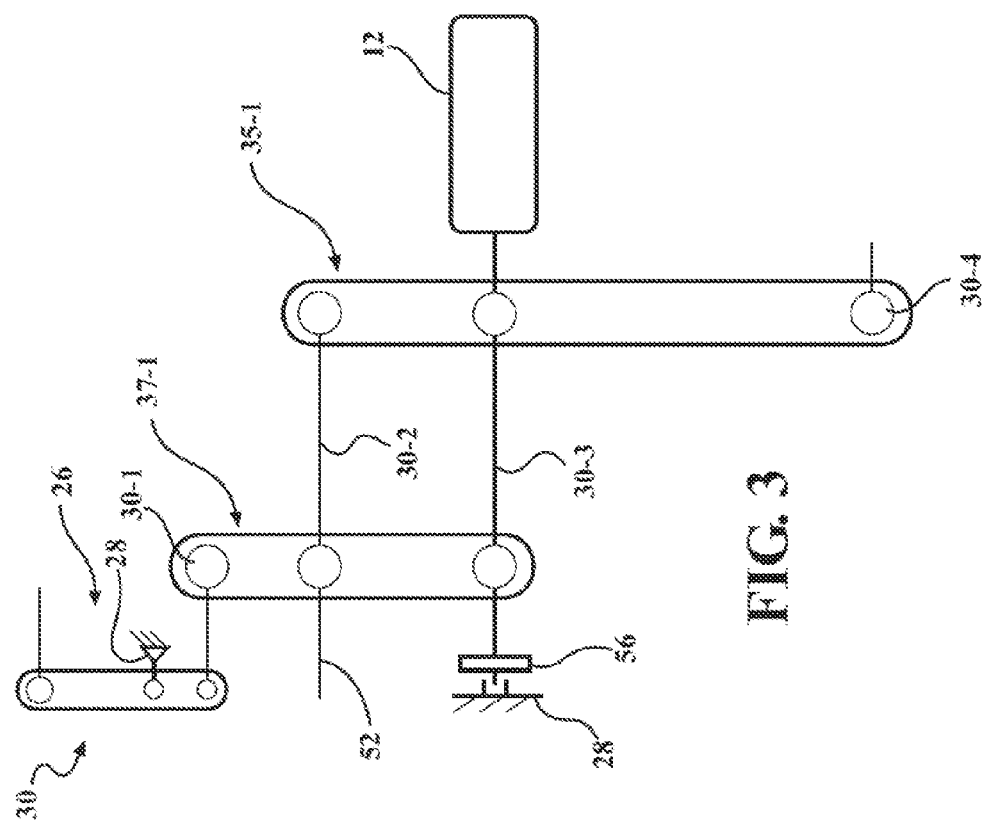
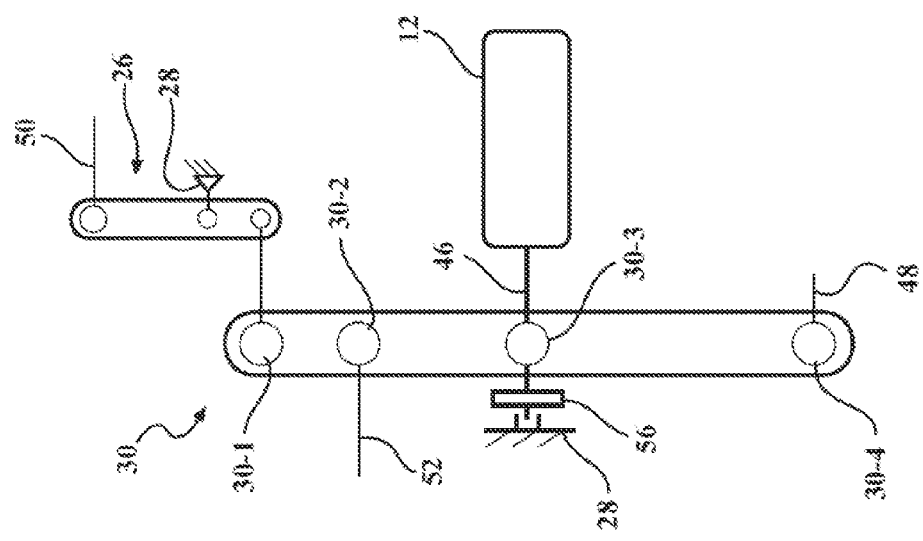

WIDE-NODE DRIVE SYSTEM

CROSS-REFERENCE TO RELATED APPLICATIONS

This application claims the benefit of U.S. Provisional Patent Application No. 61/555,788 filed on Nov. 4, 2011, which is hereby incorporated by reference in its entirety.

TECHNICAL FIELD

The disclosure relates to a wide-node drive unit for a vehicle.

BACKGROUND

To produce a more efficient vehicle, hybrid vehicle powertrains combine an electric motor and a conventional internal combustion engine. Torque from the engine and the electric motor is typically channeled to the vehicle's driven wheels via a transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor-generators and no internal combustion engine.

In either a hybrid or purely electric powertrain, the electric motors are operatively connected to a transmission which includes planetary gearing such that torque and speed of the electric motors may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motors, and, in the case of the hybrid powertrain, may similarly provide a selectable torque contribution from the engine to drive the subject vehicle.

SUMMARY

An electro-mechanical drive unit connectable with multiple power sources for launching and propelling a vehicle includes an output member, a stationary member, and a torque-transmitting device. The drive unit also includes a compound planetary gear arrangement having a first junction point, a second junction point, a third junction point, and a fourth junction point. The power sources include a first motor/generator and a second motor/generator. The first motor/generator and the second motor/generator are disposed on a common rotating axis. The second motor/generator is operatively connected to the compound planetary gear arrangement at the first junction point and the output member is operatively connected to the compound planetary gear arrangement at the second junction point. Additionally, the first motor/generator is operatively connected to the compound planetary gear arrangement at the fourth junction point. Furthermore, the torque-transmitting device is engageable to ground the third junction point to the stationary member.

The compound planetary gear arrangement may include a first planetary gear set interconnected with a second planetary gear set and a third planetary gear set interconnected with the second planetary gear set. In such a case, each respective first, second, and third planetary gear set may include a first, second, and third members. Additionally, two members of the first planetary gear set may be operatively connected to two members of the second planetary gear set, one member of the second planetary gear set may be operatively connected to one member of the third planetary gear set, and one member of the third gear set may be fixed to the stationary member.

The first junction point may be defined by the first member of the second planetary gear set. The second junction point may be defined by the first member of the first planetary gear set interconnected with the second member of the second planetary gear set. The third junction point may be defined by the second member of the first planetary gear set interconnected with the third member of the second planetary gear set. Furthermore, the fourth junction point may be defined by the third member of the first planetary gear set.

The first junction point may be defined by the first member of the first planetary gear set. The second junction point may be defined by the second member of the first planetary gear set interconnected with the first member of the second planetary gear set. The third junction point may be defined by the third member of the first planetary gear set interconnected with the second member of the second planetary gear set. Furthermore, the fourth junction point may be defined by the third member of the second planetary gear set.

In an alternative embodiment, the first junction point may be defined by the first member of the second planetary gear set interconnected with the first member of the third planetary gear set. The second junction point may be defined by the second member of the second planetary gear set interconnected with the first member of the first planetary gear set. The third junction point may be defined by the third member of the second planetary gear set interconnected with the second member of the first planetary gear set. Finally, the fourth junction point may be defined by the third member of the first planetary gear set.

The first, second, third, and fourth junction points may provide at least a 3 to 1 gear ratio spread between the torque-transmitting device and the output member. The highest numerical gear ratio in the drive unit may be approximately 4 to 1 and the lowest numerical gear ratio may be approximately 0.7 to 1.

The first motor/generator may be disposed on a first rotating axis and the second motor/generator may be disposed on a second rotating axis, wherein the first axis may be substantially parallel to the second axis.

The power sources may additionally include an internal combustion engine. In such a case, the engine may be disposed on the first rotating axis and be operatively connected to the compound planetary gear arrangement at the third junction point.

The torque-transmitting device may be selectively engaged and disengaged via an electrically actuated device. Additionally, the torque-transmitting device may be one of a band brake, a dog clutch, and a roller-ramp brake. Accordingly, if the stationary member is a housing of the electro-mechanical drive unit, the torque-transmitting device may be used to brake the third junction point relative to the housing.

The second motor/generator may be configured to generate greater torque and be physically larger than the first motor/generator. Additionally, the first motor/generator and the second motor/generator may employ non-rare earth magnets.

The drive unit may additionally include a first hydraulic pump and a second hydraulic pump. In such a case, the first pump may be operatively connected to the third junction point and the second pump may be operatively connected to the output member.

The output member may be rotatably supported by the second motor/generator on bearings.

Such a drive unit in conjunction with the engine, the first motor/generator, and the second motor/generator may be part of a single-mode wide ratio hybrid powertrain configured to launch and propel the vehicle.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 2 is a schematic lever diagram illustration of the wide-node EVT presented in stick diagram form in FIG. 1.

FIG. 3 is another embodiment of the schematic lever diagram illustration of the wide-node EVT presented in stick diagram form in FIG. 1.

DETAILED DESCRIPTION

Figure 1:
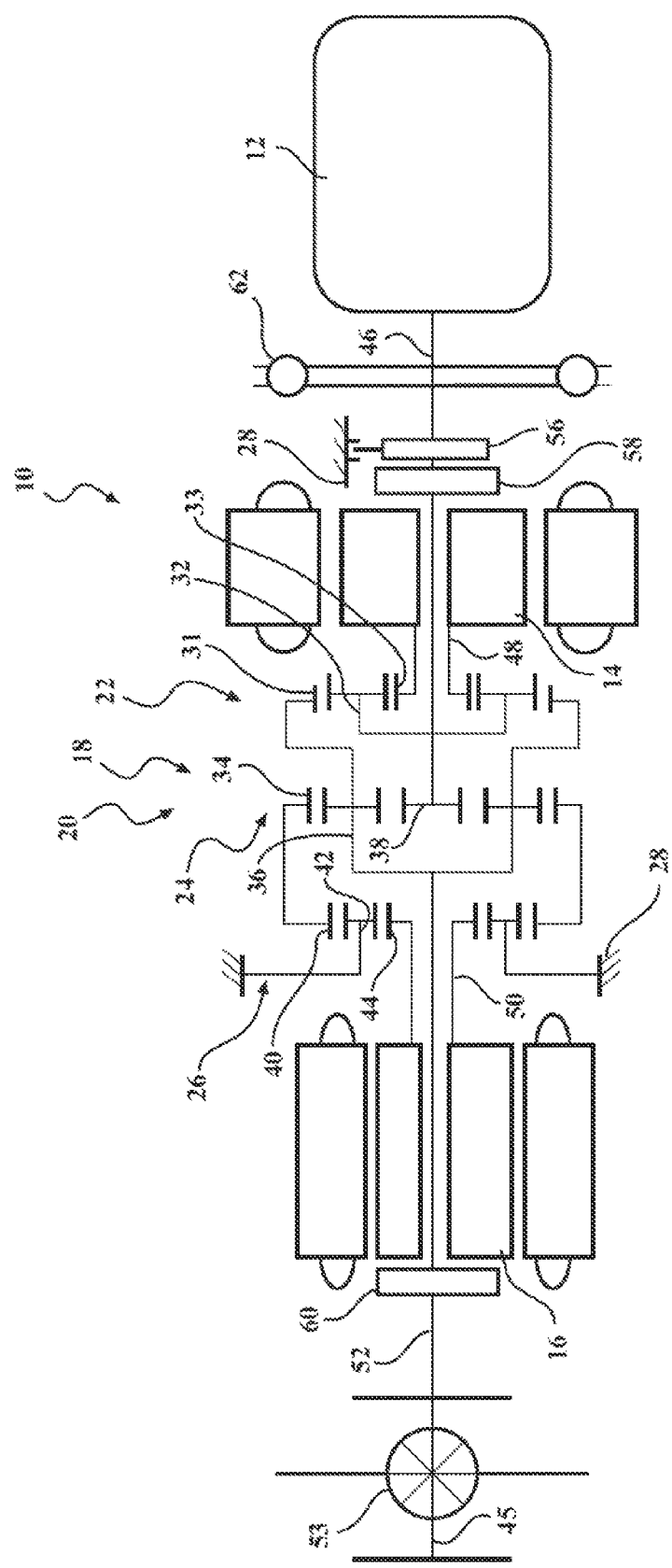
FIG. 1 is a schematic stick diagram illustration of a wide-node compound-split electrically variable transmission (EVT) employed as part of a hybrid powertrain for a vehicle.

Referring to the drawings, wherein like reference numbers refer to like components, FIG. 1 illustrates a hybrid powertrain 10 configured to launch and propel a vehicle, i.e., to operate the vehicle in all speed ranges between low and high road speeds. The hybrid powertrain 10 includes multiple power sources, which include an internal combustion engine 12, a first electric motor/generator 14, and a second electric motor/generator 16, all connected to an electro-mechanical drive unit that is depicted as an "electrically variable transmission" (EVT) 18.

The powertrain 10 additionally has an energy storage system that includes one or more batteries that are not specifically shown, but known by those skilled in the art. The energy storage system is operatively connected to the first and second motor/generators 14, 16 such that the motor/generators may transfer torque to or receive torque from the engine 12. Although not shown, the powertrain 10 also includes a controller or an electronic control unit (ECU). The controller is operatively connected to the power sources and to the energy storage system to control the distribution of torque from the power sources to the EVT 18.

As is known by those skilled in the art, an "electrically variable transmission" constitutes a transmission planetary gear train operatively connected to each of the engine 12, the first motor/generator 14, and the second motor/generator 16. Channeling respective torques of the engine 12 and the two motor/generators 14 and 16 to different members of the planetary gear train permits one of the power sources to either assist or balance the operation of any of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently.

Although the hybrid powertrain 10 as shown includes the engine 12, the EVT 18 may also be connectable solely to the first and second electric motor/generators 14, 16. In such a case, the powertrain 10 would no longer be a hybrid type, but would become purely electric, and the EVT 18 may then be broadly described as an electro-mechanical drive unit. For simplicity and clarity, the remainder of the present description will refer to the electro-mechanical drive unit as EVT 18 being connected to the engine 12, as well as to the motor/generators 14, 16. Additionally, the connections of the hybrid powertrain 10, to be described in greater detail below, may permit an overall decrease in torque requirement from the combination of the first and the second motor/generators 14 and 16 while affording acceptable vehicle performance, as compared with other systems.

The EVT 18 includes three planetary gear sets represented in lever diagram form in FIG. 2. A lever diagram is a schematic representation of the components of a mechanical device such as an automatic transmission. Each individual lever may represent an individual planetary gear set, a compound planetary gear arrangement having two or more interconnected planetary gear sets, or an external gear set. In the planetary gear set lever, the three basic mechanical components of the subject gear set, i.e., the sun gear, planet gear carrier, and ring gear members, are each represented by a junction point on the particular lever. Therefore, a typical single planetary gear set lever contains three junction points: one for the sun gear member, one for the planet gear carrier member, and one for the ring gear member. The relative length between the junction points of each planetary gear set lever can be used to represent the ring-to-sun gear ratio of each respective gear set. These lever ratios, in turn, are used to vary the gear ratios of the transmission in order to achieve appropriate ratios and ratio progression. Mechanical couplings or interconnections between the junction points of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis" (1981), which is hereby fully incorporated by reference.

As may be seen in FIGS. 1 and 2, the EVT 18 includes a compound-split planetary gear arrangement 20. In general, as known by those skilled in the art, a four-junction point lever, as shown in FIG. 2, is established by providing two separate fixed connections, i.e., pairings, between a member of one planetary gear set and a member of another planetary gear set. Such fixed connections may, for example, be provided between a planet carrier of one gear set and a ring gear of another gear set, or between a planet carrier of one gear set and a sun gear of another. When a single such fixed connection is employed, the subject connection serves to reduce the maximum number of separately rotating inertias (about a common central axis) from six to four, and the total degrees of freedom from four to two. Thus constrained, the compound-split planetary gear arrangement 20 provides, in order of rotational speed, first, second, third, and fourth junction points. However, as understood by those skilled in the art, various compound planetary gear arrangements may be constructed to provide a four-junction point lever that will accomplish such a result, and place them within the scope of the lever diagram of FIG. 2.

As shown in FIG. 1, the compound-split planetary gear arrangement 20 includes a first planetary gear set 22 interconnected with a second planetary gear set 24 and a third planetary gear set 26 interconnected with the second planetary gear set 24. Additionally, the compound-split planetary gear arrangement 20 includes two members of the first planetary gear set 22 being operatively connected to two members of the second planetary gear set 24, one member of the second planetary gear set being operatively connected to one member of the third planetary gear set 26, and one member of the third planetary gear set being fixed to a stationary member 28. The stationary member 28 may be a case or housing of the EVT 18, while the member fixed thereto may be the second member of the third gear set 26. A lever 30 representing the compound-split planetary gear arrangement 20 includes a first, second, third, and fourth junction points 30-1, 30-2, 30-3, and 30-4, respectively, and is shown in each of FIGS. 2 and 3. The first junction point 30-1 represents or is defined by the first member of the second planetary gear set 24, the second junction point 30-2 is defined by the first member of the first planetary gear set 22 interconnected with the second member of the second planetary gear set 24, the third junction point 30-3 is defined by the second member of the first planetary gear set interconnected with the third member of the second planetary gear set, and the fourth junction point 30-4 is defined by the third member of the first planetary gear set.

Referring back to FIG. 1, the first gear set 22 includes a ring gear member 31, a carrier gear member 32, and a sun member 33. Additionally, the second gear set 24 includes a ring gear member 34, a carrier gear member 36, and a sun member 38. Furthermore, the third gear set 26 includes a ring gear member 40, a carrier gear member 42, and a sun member 44. Consistent with the above structure of the first, second, and third gear sets 22, 24, 26, the first junction point 30-1 may represent the ring gear member 34 of the second gear set 24. Additionally, the second junction point 30-2 may represent the ring gear member 31 of the first gear set 22 interconnected with the carrier member 36 of the second gear set 24. The third junction point 30-3 may represent the carrier member 32 of the first gear set 22 interconnected with the sun gear member 38 of the second gear set 24. Finally, the fourth junction point 30-4 may represent the sun gear member 33 of the first gear set 22. Accordingly, the first planetary gear set 22, the second planetary gear set 24, and the third planetary gear set 26 are connected such that the resultant structure produces a four junction point lever that includes the junction points 30-1, 30-2, 30-3, and 30-4, although the individual gear set members do not necessarily have to be connected in the order presented above.

As shown in FIG. 3, the lever 30 may also be represented by two individual levers 35-1 and 37-1 that may correspond to the first planetary gear set 22 and the second planetary gear set 24, respectively. Accordingly, in FIG. 3 the junction points 30-2 and 30-3 are represented by fixed interconnections, such that the resultant structure effectively generates a four-junction point lever, similar to that shown in FIG. 2. As such, the powertrain 10 shown in FIG. 1 is a specific embodiment of a powertrain 10 represented by the lever diagram shown in FIG. 2. Accordingly, the EVT 18 as shown in FIG. 1 is represented by a schematic stick diagram and depicts a specific compound-split planetary gear arrangement 20 that corresponds to and is reflected by the lever diagram of FIG. 2. Although a specific powertrain 10 is represented in FIG. 1, it will be understood that the particular embodiment is simply exemplary in nature, and other powertrain arrangements within the scope of the lever diagram of FIG. 2 are also contemplated.

As may be seen in FIG. 1, the engine 12 and the first motor/generator 14 and the second motor/generator 16 are disposed on a common rotating axis 45. The engine 12, the first motor/generator 14, and the second motor/generator 16 are operatively connected to the EVT 18 via an input member arrangement which transmits torque from the power sources to the compound-split planetary gear arrangement 20. The input member arrangement includes an output shaft of the engine 12 which serves as an input member 46, a rotor of the first motor/generator 14 that serves as an input member 48, and a rotor of the second motor/generator 16 that serves as an input member 50. The input member 46 is configured to provide engine torque to the EVT 18. The input member 48 and input member 50 are each configured to provide torque from the first motor/generator 14 and the second motor/generator 16, respectively, to the EVT 18. As may be seen in FIG. 2, the input member 46 is continuously connected to the third junction point 30-3, the input member 48 is continuously connected to the fourth junction point 30-4, and the input member 50 is continuously connected to the junction point 30-1.

The EVT 18 also includes an output member 52. The output member 52 is continuously connected to the second junction point 30-2 and is configured to provide output torque from the compound-split planetary gear arrangement 20 for launching and propelling the vehicle. Additionally, as shown in FIG. 1, the output member 52 may extend through the rotor of the second motor/generator 16 and be rotatably supported by the second motor/generator via one or more bearings. As also shown in FIG. 2, the input member 46 may similarly extend through the rotor of the first motor/generator 14, and, accordingly, be rotatably supported by the first motor/generator via one or more bearings. As shown in FIG. 1, the output member 52 may connect the carrier member 36 to a differential unit 53.

As may be seen in FIGS. 2 and 3, the third junction point 30-3 is selectively connectable with the stationary member 28 via an engageable torque-transmitting device 56, to thereby ground the junction point 30-3. The torque-transmitting device 56 may be selectively engaged and disengaged via an electrically actuated device, such as a solenoid. Additionally, the torque-transmitting device 56 may be configured either as a band, a roller-ramp one-way-clutching, a dog clutch, or a sprag type of a brake. Accordingly, the torque-transmitting device 56 may be used to brake the third junction point 30-3 relative to the stationary member 28. The electrically actuated torque-transmitting device 56 permits reduced efficiency losses in the hybrid powertrain 10, as well as in a purely electric powertrain application, i.e., sans the engine 12. Additionally, the electrically actuated torque-transmitting device 56 enables increased drive torque capability for the purely electric powertrain application.

Figure 4:
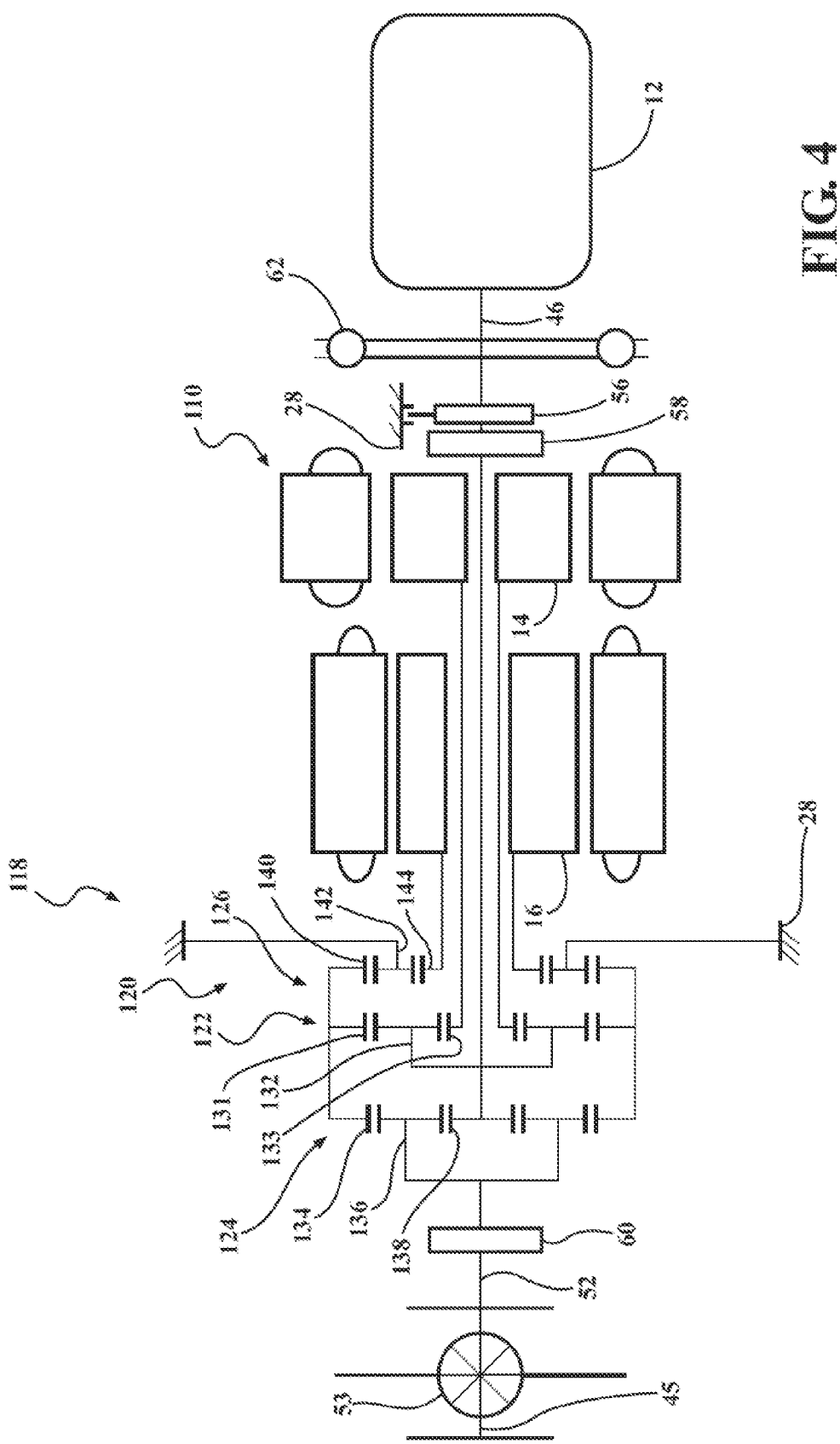
FIG. 4 is a schematic stick diagram illustration of another embodiment of a wide-node EVT employed as part of a hybrid powertrain for a vehicle.

A hybrid powertrain 110 is depicted in FIG. 4. The hybrid powertrain 110 is similar to the hybrid powertrain 10 shown in FIG. 1 in that the hybrid powertrain 110 may also be represented by the lever 30 shown in FIG. 2, and is therefore another embodiment of the subject wide-node EVT. The hybrid powertrain 110 includes an EVT 118 with a compound-split planetary gear arrangement 120. As shown in FIG. 4, the compound-split planetary gear arrangement 120 includes a first planetary gear set 122 interconnected with a second planetary gear set 124 and includes two members of the first planetary gear set being operatively connected to two members of the second planetary gear set. As may be seen in FIG. 5, a lever 130 may also represent the compound-split planetary gear arrangement 120. The lever 130 includes a first, second, third, and fourth junction points 130-1, 130-2, 130-3, and 130-4, respectively. The first junction point 130-1 represents or is defined by the first member of the first planetary gear set 122 interconnected with the first member of the second planetary gear set 124, the second junction point 130-2 is defined by the second member of the second planetary gear set, the third junction point 130-3 is defined by the third member of the second planetary gear set interconnected with the second member of the first planetary gear set, and the fourth junction point 130-4 is defined by the third member of the first planetary gear set.

Figure 5:
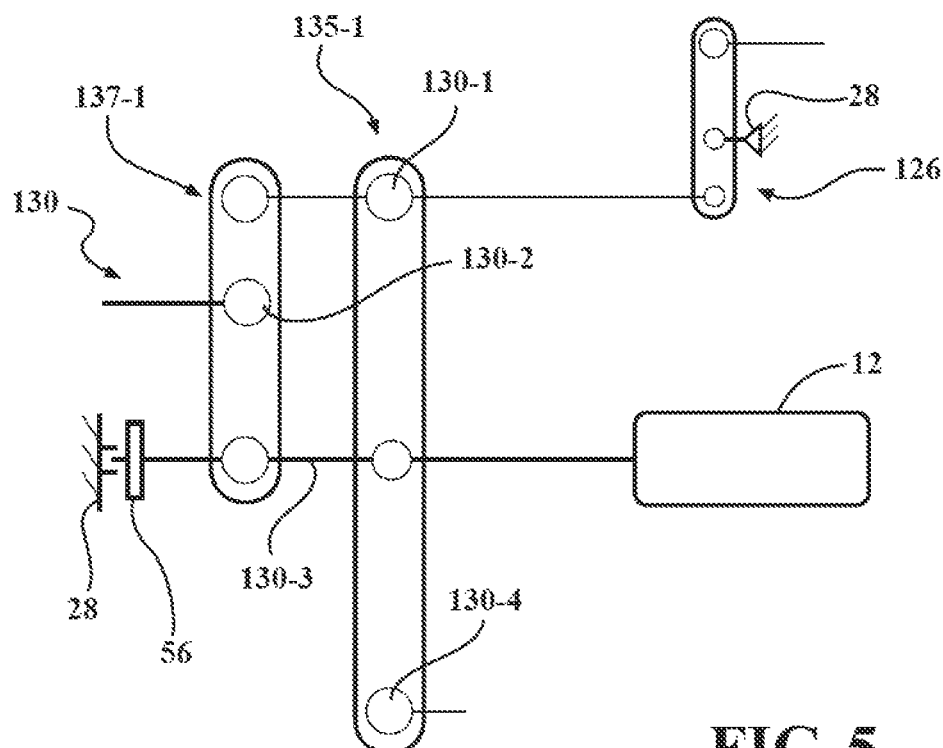
FIG. 5 is a schematic lever diagram illustration of the wide-node EVT presented in stick diagram form in FIG. 4.

As additionally shown in FIG. 4, the first gear set 122 includes a ring gear member 131, a carrier gear member 132, and a sun member 133. Additionally, the second gear set 124 includes a ring gear member 134, a carrier member 136, and a sun gear member 138. Furthermore, the third gear set 126 includes a ring gear member 140, a carrier member 142, and a sun gear member 144. Consistent with the above structure of the first, second, and third gear sets 122, 124, 126, the first junction point 130-1 may represent the ring gear member 131 of the first gear set 122. Additionally, the second junction point 130-2 may represent the carrier member 136 of the second gear set 124. The third junction point 130-3 may represent the carrier member 132 of the first gear set 122 interconnected with the sun gear member 138 of the second gear set 124. Finally, the fourth junction point 130-4 may represent the sun gear member 133 of the first gear set 122. Accordingly, the first planetary gear set 122, the second planetary gear set 124 and the third planetary gear set 126 are connected such that the resultant structure produces a four-junction point lever that includes the junction points 130-1, 130-2, 130-3, and 130-4, although the individual gear set members do not necessarily have to be connected in the order presented above. As shown in FIG. 5, the lever 130 may be represented by two individual levers 135-1 and 137-1 that may correspond to the first planetary gear set 122 and the second planetary gear set 124, respectively. Furthermore, the lever 130 may also be represented by the lever 30, which is depicted in FIG. 2.

A particular benefit of the described arrangement of the first, second, third, and fourth junction points 26-1, 26-2, 26-3, 26-4 of the EVT 18 and the junction points 130-1, 130-2, 130-3, 130-4 of the EVT 118 is that the subject EVTs are capable of providing a wide-node gear ratio spread, as shown by the graph shown in FIG. 6 and which will be described in greater detail below. As employed herein, the concept of "node width" represents the distance traveled by the vehicle per each revolution of the engine 12, and the term "wide-node" is indicative of the distance traveled by a vehicle employing the EVT 18 or EVT 118 as compared to a vehicle employing a typical single-mode EVT.

Figure 6:
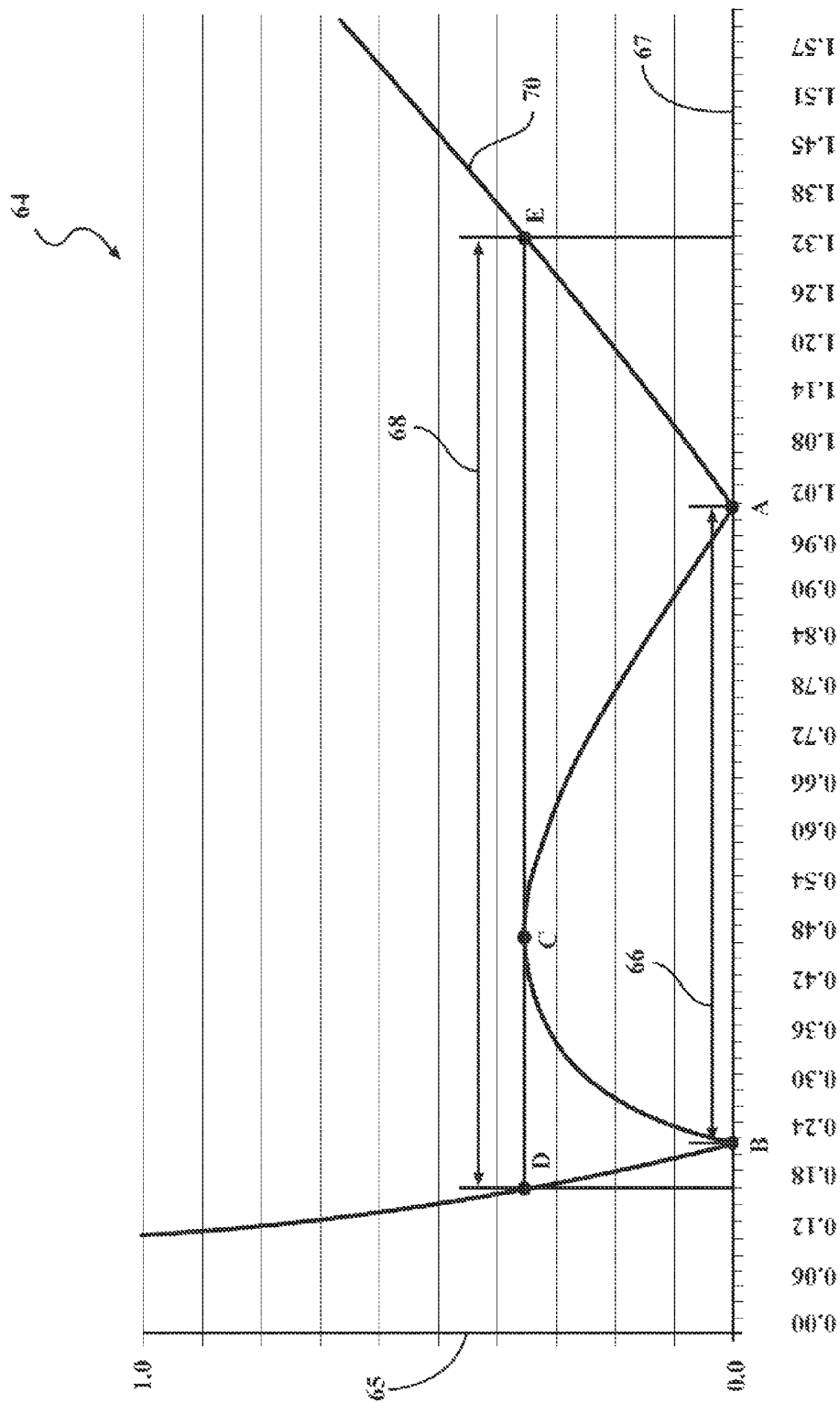
FIG. 6 is a graph illustrating a comparison of vehicle distance traveled per engine revolution for the wide-node EVTs shown in FIGS. 1-5.

FIG. 6 shows a graph 64 of electrical power path magnitude as a fraction of engine torque used to drive the vehicle versus the vehicle distance traveled per engine revolution in meters traced by a curve 70. The electrical power path magnitude is shown on the Y-axis of the graph 64 and is represented by numeral 65, while the vehicle distance traveled per engine revolution is shown on the X-axis of the graph and is represented by numeral 67. Additionally, the graph 64 compares node widths of exemplary embodiments of the EVT 18 and EVT 118 which are represented by a distance 66 between mechanical points or nodes identified by letters A and B and a distance 68 between points identified by letters D and E plotted on the curve 70. In a specific example, the distance 66 traveled by the vehicle per each revolution of the engine 12 with the EVT 18 and EVT 118, when electric power path (from the first and second motor/generators 14, 16) is zero, exceeds approximately 0.8 meters. As shown, for the same configuration, the distance 68 traveled by the vehicle per each revolution of the engine 12 when electric power from the first and second motor/generators 14, 16 is approximately equal to a fraction of engine power identified by letter C and exceeds 1.2 meters. By comparison, in a typical single-mode compound-split EVT the distance 66 is generally around 0.5 meters, while also having the distance 68 of under of 1.2 meters. Accordingly, the greater distance 66 for the EVT 18 and EVT 118 than for a typical representative single-mode compound-split EVT identifies the EVT 18 and EVT 118 as having a wider-node gear ratio spread.

As a result, the EVT 18 and EVT 118 are capable of providing at least a 3 to 1 gear ratio spread between the torque-transmitting device 56 (i.e., the input member 46) and the output member 52. Furthermore, the highest numerical gear ratio of the EVT 18 and EVT 118 having such an arrangement of the first, second, third, and fourth junction points 30-1, 30-2, 30-3, 30-4 may have approximately 4 to 1 as its highest numerical gear ratio and approximately 0.7 to 1 as its lowest numerical gear ratio. As a result, the first motor/generator 14 may be sized differently, i.e., be physically smaller, than the second motor/generator 16. Accordingly, the first motor/generator 14 may be configured to generate less torque than the second motor/generator 16. Additionally, each of the first and second motor/generators 14, 16 may be configured with solid cores and employ non-rare earth magnets which are significantly more ubiquitous and less expensive than rare earth type.

Referring back to FIGS. 1 and 4, each of the EVT 18 and EVT 118 also includes a first hydraulic pump 58 and a second hydraulic pump 60. The first and the second hydraulic pumps 58, 60 are configured to supply pressurized fluid to lubricate the compound-split planetary gear arrangement 20, as well as the engine 12 and the first and second motor/generators 14, 16. As shown, the first pump 58 is operatively connected to the third junction point 30-3 and the second pump 60 is operatively connected to the output member 52, however, the positions of the two pumps may be interchanged. Each of the pumps 58, 60 may be either mechanically or electrically actuated and provide variable oil flow and/or pressure. Such variable flow and/or pressure pumps 58, 60 may be useful in facilitating sufficient supply of oil for EVT 18 and EVT 118 in high stress/load applications, such as in the event the subject vehicle is employed for towing a trailer. Each of the EVT 18 and EVT 118 also includes a damper 62. The damper 62 is operatively connected to the engine 12 and is configured to absorb torsional vibrations generated by the engine before such vibrations may be transmitted to the compound-split planetary gear arrangement 20 via the input member 46.

The preceding configurations of the EVT 18 and EVT 118 are cost effective, single-mode compound-split electro-mechanical drive unit which embodies advantages of a two-mode system that provides a first mode for launching a vehicle from rest and a separate second mode for propelling the subject vehicle at higher speeds, but eschews the two-mode system's mechanical and controls complexity. Accordingly, each of the EVT 18 and EVT 118 is a single-mode compound-split electro-mechanical drive unit that enables sufficient torque to be generated and channeled for launching and propelling the vehicle, as well as supports an engine stop-start function. Additionally, the EVT 18 and EVT 118 are capable of providing reduced losses in operating efficiency of the powertrain 10 during both drive and electric regeneration of the vehicle's energy storage system operating modes. Moreover, because the EVT 18 and EVT 118 are each a single-axis layout, i.e., all three power sources (the engine 12, the motor/generator 14, and the motor/generator 16) are disposed on the common rotating axis 45, the EVTs 18 and 118 are particularly suitable to rear-wheel-drive vehicle applications, where the powertrain 10 is substantially aligned with respect to longitudinal axis of the subject vehicle.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An electro-mechanical drive unit connectable with multiple power sources for launching and propelling a vehicle, comprising:
   an output member;
   a stationary member;
   a torque-transmitting device; and
   a compound planetary gear arrangement having a first junction point, a second junction point, a third junction point, and a fourth junction point;
   the power sources including:
   a first motor/generator; and
   a second motor/generator;
   wherein:
   the compound planetary gear arrangement includes a first planetary gear set interconnected with a second planetary gear set, and also includes a third planetary gear set interconnected with the second planetary gear set;
   the first motor/generator and the second motor/generator are disposed on a common rotating axis;
   the second motor/generator is operatively connected to the compound planetary gear arrangement at the first junction point;
   the output member is operatively connected to the compound planetary gear arrangement at the second junction point;
   the first motor/generator is operatively connected to the compound planetary gear arrangement at the fourth junction point;
   the torque-transmitting device is engageable to ground the third junction point to the stationary member;
   each respective first, second, and third planetary gear set includes first, second, and third members;
   two members of the first planetary gear set are operatively connected to two members of the second planetary gear set; and
   one member of the second planetary gear set is operatively connected to one member of the third planetary gear set, and one member of the third gear set is fixed to the stationary member.

2. The electro-mechanical drive unit according to claim 1, wherein the first junction point is defined by the third member of the third planetary gear set, the second junction point is defined by the first member of the first planetary gear set interconnected with the second member of the second planetary gear set, the third junction point is defined by the second member of the first planetary gear set interconnected with the third member of the second planetary gear set, and the fourth junction point is defined by the third member of the first planetary gear set.

3. The electro-mechanical drive unit according to claim 1, wherein the first junction point is defined by the first member of the second planetary gear set interconnected with the first member of the third planetary gear set, the second junction point is defined by the second member of the second planetary gear set interconnected with the first member of the first planetary gear set, the third junction point is defined by the third member of the second planetary gear set interconnected with the second member of the first planetary gear set, and the fourth junction point is defined by the third member of the first planetary gear set.

4. The electro-mechanical drive unit according to claim 1, wherein the first, second, third, and fourth junction points provide at least a 3 to 1 gear ratio spread between the torque-transmitting device and the output member.

5. The electro-mechanical drive unit according to claim 1, wherein the multiple power sources additionally include an internal combustion engine that is disposed on the common rotating axis with the first and second motor/generators and is operatively connected to the compound planetary gear arrangement at the third junction point.

6. The electro-mechanical drive unit according to claim 1, wherein the torque-transmitting device is selectively engaged and disengaged via an electrically actuated device.

7. The electro-mechanical drive unit according to claim 1, wherein the torque-transmitting device is one of a band brake, dog clutch, and a roller-ramp brake.

8. The electro-mechanical drive unit according to claim 1, wherein the second motor/generator is configured to generate greater torque and is physically larger than the first motor/generator, and wherein each of the first and second motor/generators employ non-rare earth magnets.

9. The electro-mechanical drive unit according to claim 1, further comprising a first hydraulic pump and a second hydraulic pump, wherein the first hydraulic pump is operatively connected to the third junction point and the second hydraulic pump is operatively connected to the output member.

10. The electro-mechanical drive unit according to claim 1, wherein the output member is rotatably supported by the second motor/generator.

11. A single-mode wide ratio hybrid powertrain for launching and propelling a vehicle, comprising:
   an engine;
   a first motor/generator;
   a second motor/generator; and
   an electrically-variable transmission having:
      an output member;
      a stationary member;
      a torque-transmitting device; and
      a compound planetary gear arrangement having a first junction point, a second junction point, a third junction point, and a fourth junction point;
   wherein:
      the compound planetary gear arrangement includes a first planetary gear set interconnected with a second planetary gear set, and also includes a third planetary gear set interconnected with the second planetary gear set;
      the engine, the first motor/generator, and the second motor/generator are disposed on a common rotating axis;
      the second motor/generator is operatively connected to the compound planetary gear arrangement at the first junction point;
      the output member is operatively connected to the compound planetary gear arrangement at the second junction point;
      the engine is operatively connected to the compound planetary gear arrangement at the third junction point;

the first motor/generator is operatively connected to the compound planetary gear arrangement at the fourth junction point;

the torque-transmitting device is engageable to ground the third junction point to the stationary member;

each respective first, second, and third planetary gear set includes first, second, and third members;

two members of the first planetary gear set are operatively connected to two members of the second planetary gear set; and one member of the second planetary gear set is operatively connected to one member of the third planetary gear set, and one member of the third gear set is fixed to the stationary member.

12. The hybrid powertrain according to claim 11, wherein the first junction point is defined by the third member of the third planetary gear set, the second junction point is defined by the first member of the first planetary gear set interconnected with the second member of the second planetary gear set, the third junction point is defined by the second member of the first planetary gear set interconnected with the third member of the second planetary gear set, and the fourth junction point is defined by the third member of the first planetary gear set.

13. The hybrid powertrain according to claim 11, wherein the first junction point is defined by the first member of the second planetary gear set interconnected with the first member of the third planetary gear set, the second junction point is defined by the second member of the second planetary gear set interconnected with the first member of the first planetary gear set, the third junction point is defined by the third member of the second planetary gear set interconnected with the second member of the first planetary gear set, and the fourth junction point is defined by the third member of the first planetary gear set.

14. The hybrid powertrain according to claim 11, wherein the first, second, third, and fourth junction points provide at least a 3 to 1 gear ratio spread between the torque-transmitting device and the output member.

15. The hybrid powertrain according to claim 11, wherein the torque-transmitting device is selectively engaged and disengaged via an electrically actuated device.

16. The hybrid powertrain according to claim 11, wherein the torque-transmitting device is one of a band brake, dog clutch, and a roller-ramp brake.

17. The hybrid powertrain according to claim 11, wherein the first motor/generator and the second motor/generator employ non-rare earth magnets.

18. The hybrid powertrain according to claim 11, wherein the second motor/generator is configured to generate greater torque and is physically larger than the first motor/generator.

19. The hybrid powertrain according to claim 11, further comprising a first hydraulic pump and a second hydraulic pump, wherein the first hydraulic pump is operatively connected to the third junction point and the second hydraulic pump is operatively connected to the output member.

20. The hybrid powertrain according to claim 11, wherein the output member is rotatably supported by the second motor/generator.

* * * * *